United States Patent
Heinz

(10) Patent No.: US 6,442,004 B1
(45) Date of Patent: Aug. 27, 2002

(54) MAGNETIC HEAD LINEAR ACTUATOR ASSEMBLY FOR A MAGNETIC DATA STORAGE DRIVE

(75) Inventor: John Eric Heinz, Plymouth, MN (US)

(73) Assignee: Imation Corp., Oakdale, MN (US)

(*) Notice: Subject to any disclaimer, the term of this patent is extended or adjusted under 35 U.S.C. 154(b) by 119 days.

(21) Appl. No.: 09/670,634

(22) Filed: Sep. 27, 2000

(51) Int. Cl.[7] ................................................ G11B 5/56
(52) U.S. Cl. .................................................... 360/291
(58) Field of Search ................................ 360/291, 290, 360/240, 241, 241.1, 241.3, 251.1, 251.4, 260, 261, 261.1, 261.3

(56) References Cited

U.S. PATENT DOCUMENTS

| | | | |
|---|---|---|---|
| 3,277,433 A | * 10/1966 | Toulis | 310/337 |
| 4,363,046 A | * 12/1982 | Saito | 360/291.6 |
| 4,985,794 A | * 1/1991 | Kato et al. | 360/281.7 |
| 5,191,492 A | * 3/1993 | Nayak et al. | 360/77.12 |
| 5,280,402 A | 1/1994 | Anderson et al. | 360/106 |
| 5,343,348 A | * 8/1994 | Nishima et al. | 360/291.7 |
| 5,377,052 A | 12/1994 | Guzman et al. | 360/106 |
| 5,379,170 A | 1/1995 | Schwarz | 360/109 |
| 5,414,578 A | * 5/1995 | Lian et al. | 360/261.3 |
| 5,568,327 A | 10/1996 | Pahr et al. | 360/53 |
| 5,793,574 A | 8/1998 | Cranson et al. | 360/106 |
| 6,075,678 A | 6/2000 | Saliba | 360/106 |
| 6,137,659 A | * 10/2000 | Warmenhoven | 360/261.1 |

* cited by examiner

*Primary Examiner*—David Hudspeth
*Assistant Examiner*—Angel Castro
(74) *Attorney, Agent, or Firm*—Eric D. Levinson

(57) ABSTRACT

A magnetic head element linear actuator assembly including a base, a platform, a core, a coil, a plurality of slats and a plurality of magnetic bars. The platform is positioned opposite the base and is configured to maintain a magnetic recording head. The core is disposed between the base and the platform such that a space is defined between the core and the platform. The coil is wound about a central axis of the core. The plurality of slats rigidly maintain the platform relative to the base. Further, the plurality of slats are deflectable from a straightened state and are biased to return to the straightened state following deflection. Finally, the magnetic bars are secured to respective ones of the plurality of slats adjacent the coil. With this configuration, a magnetic field generated by the coil induces deflection of the plurality of slats via the magnetic bars. In response, the platform moves linearly toward the base.

20 Claims, 4 Drawing Sheets

MAGNETIC HEAD LINEAR ACTUATOR ASSEMBLY FOR A MAGNETIC DATA STORAGE DRIVE

BACKGROUND OF THE INVENTION

The present invention relates to an actuator assembly for maintaining and linearly positioning a magnetic head. More particularly, it relates to a non-frictional linear actuator assembly for fine positioning of a magnetic head, especially for use in a tape drive.

The use of magnetic tapes or disks to record, store and retrieve data is highly prevalent in today's society. In general terms, the same magnetic principles apply to data storage on both magnetic tapes and disks. Namely, one or more magnetic recording heads are employed to record and retrieve data onto tracks formed along the tape or disk media. To this end, tape drive and disk drive manufacturers continually strive to improve upon the mechanisms utilized to accurately position and maintain the magnetic recording head relative to the track in question.

With specific reference to tape drives, a storage tape is driven along a tape path so as to interface with a magnetic head element having one ore more magnetic recording heads. A positioning mechanism is typically employed to transversely position the head with respect to the tape path (or the width of the storage tape) so as to enable recording and playback of any of a plurality of parallel tracks formed along the storage tape. Normally, a coarse positioning device, such as a stepper motor, a lead screw driven by the stepper motor and a head-mounting slide engaged with the lead screw, aligns the magnetic head element relative to a desired track Advances in the magnetic tape media technology has greatly increased data capacity by narrowing the width of individual tracks, thereby increasing the total number of available tracks on the storage tape. Head technology has correspondingly improved to accommodate and properly interact with the now more narrow tracks.

Generally speaking, coarse positioning devices are able to accurately index the head element transversely relative to the tape path. This indexing is based upon an assumed position of the storage tape relative to the head element. In this regard, every effort is made to precisely and consistently position the storage tape relative to the head element. Unfortunately, however, variations in tape position during tape transport is unavoidable. For example, tape edge variations, environmental thermal expansion and contraction, formatting inaccuracies, etc., invariably occur, leading to inadvertent transverse tape movement. For a narrow track storage tape, even a minute transverse displacement may cause a head tracking error.

To compensate for transverse displacement of the storage tape during use, tape drive systems commonly include a closed loop servo-tracking system whereby one of the tracks associated with the storage tape serves as a servo-track. The magnetic head designated to follow the servo-track essentially "monitors" the transverse position of the servo-track, and thus of the storage tape. The tracking system evaluates this transverse position information and, where necessary, transversely maneuvers the magnetic head element in a corresponding fashion. To this end, coarse positioning mechanisms are unable to instantaneously maneuver the magnetic recording head, and therefore are unacceptable with high-density tape applications. Instead, an additional fine positioning mechanism must be incorporated into the tape drive.

A variety of different fine positioning mechanisms or actuators have been envisioned. For example, it has been proposed to combine a stepper motor as a coarse positioner with a linear voice coil motor acting as a fine track positioner. The mechanism associated with the voice coil is typically complex, and rely upon one more springs, levers, cams, etc. to instantaneously maneuver and maintain the head element in response to energization of the voice coil as part of a closed servo-loop system. In this regard, existing fine positioning mechanisms are not rigid in all axes other than the desired linear axis, and therefore require additional frictional devices (such as bearings, etc.) to rigidly support the head element. Without this rigidity, non-linear articulation of the head element may occur, leading to undesirable tracking errors.

The technology associated with magnetic data storage continues to evolve. With respect to magnetic tape systems, these enhancements have placed a great emphasis on the ability to precisely position and re-position the head element relative to data tracks on the associated storage tape. Existing positioning or actuator technology may have certain drawbacks, and are relatively expensive. Therefore, a need exists for a magnetic head linear actuator assembly that is rigid in all axes other than the desired linear axis on a cost-effective basis.

SUMMARY OF THE INVENTION

One aspect of the present invention provides a magnetic recording head element linear actuator assembly. The actuator assembly includes a base, a platform, a core, a coil, a plurality of slats and a plurality of magnetic bars. The platform is positioned opposite the base and is configured to maintain a magnetic head element. The core is disposed between the base and the platform such that a space is defined between the core and the platform. The coil is wound about a central axis of the core. The plurality of slats maintain the platform relative to the base. In this regard, the plurality of slats are each deflectable from a straightened state, and are biased to return to the straightened state following deflection. Finally, the plurality of magnetic bars are secured to respective ones of the plurality of slats adjacent the coil. With this configuration and during use, a magnetic field generated by the coil induces deflection of the plurality of slats via the magnetic bars, thereby causing the platform to move linearly toward the base. In one preferred embodiment, a central passage is formed through the platform, core, and base, and is sized for assembling the linear actuator assembly to a coarse positioning mechanism, such as a lead screw. In another preferred embodiment, the coil and the magnetic bars are centrally positioned relative to the base and the platform.

Another aspect of the present invention relates to a tape drive for recording data on, and reading data from, any one of a plurality of parallel data tracks extending along a length of magnetic storage tape with a magnetic head element adapted to interface with the tape along a tape transport path and to be variably positioned transversely relative to the tape transport path. The tape drive comprises a magnetic head element and a fine positioning, linear actuator assembly. The linear actuator assembly maintains the magnetic head element at an interface position with the storage tape and maneuvers the magnetic head transversely relative to the tape transport path. In this regard, the actuator assembly includes a base, a platform, a core, a coil, a plurality of slats and a plurality of magnetic bars. The platform is positioned opposite the base. The magnetic head element is secured to an outer surface of the platform. The core is disposed between the base and platform such that a spacing exists between the core and an inner surface of the platform. The core is wound about a central axis of the core. The plurality of slats rigidly maintain the platform relative to the base. Further, the plurality of the slats are each deflectable from a straightened state, and are biased to return to the straightened state following deflection. Finally, the plurality of magnetic bars are secured to respective ones of the plurality of slats adjacent the coil. With this configuration, a magnetic field selectively generated by the coil induces deflection of the plurality of slats via the magnetic bars. Upon deflection, the platform and the attached magnetic head element are caused to move toward the base, transversely relative to the tape transport path. In one preferred embodiment, the tape drive further includes a servo-controller electrically connected to the magnetic head element and the coil. With this configuration, the servo-controller prompts current delivery to the coil commensurate with a deviation in transverse tape positioning as otherwise sensed by the magnetic head element.

DESCRIPTION OF THE PREFERRED EMBODIMENTS

Figure 1:
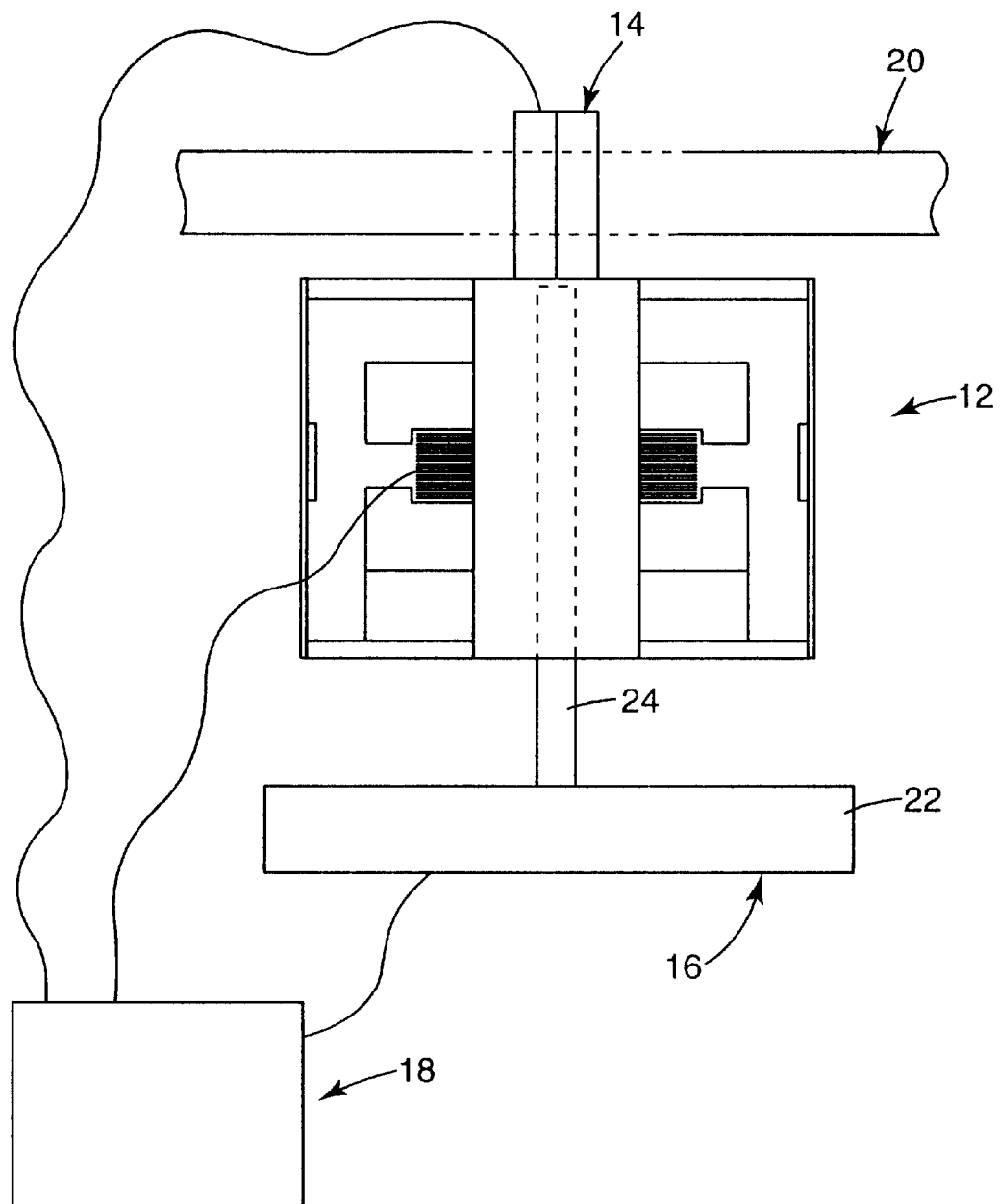
FIG. 1 is a front view of a portion of a tape drive including a linear actuator assembly in accordance with the present invention.

One embodiment of a tape drive 10 including a linear actuator assembly 12 in accordance with the present invention is depicted in the front view of FIG. 1. In addition to the linear actuator assembly 12, the tape drive 10 includes a magnetic head element 14, a coarse positioning device 16 and a servo-controller 18 (depicted in block form). The various components of the tape drive 10 are described in greater detail below. Generally, the linear actuator assembly 12 maintains the magnetic head element 14 (including one or more magnetic recording heads) and is connected to the coarse positioning device 16. In this regard, the linear actuator assembly 12 maintains the magnetic head element 14 relative to track(s) on a magnetic storage tape 20 (shown generally in FIG. 1). The storage tape 20 includes a multiplicity of parallel tracks (not shown), and is driven along a transport path across the magnetic head element 14. The servo-controller 18 is electrically connected to the linear actuator assembly 12, the coarse positioning devices 16 and the magnetic head element 14. During use, the servo-controller 18 signals the coarse positioning device 16 to index the magnetic head element 14 relative to the storage tape 20. Further, the servo-controller 18 monitors lateral position of the magnetic head element 14 relative to the storage tape 20 and, when necessary, prompts the linear actuator assembly 12 to effectuate fine positioning of the magnetic head element 14 relative to the storage tape 20.

The coarse positioning device 16 can assume a wide variety of forms, and in one embodiment includes a stepper motor 22 that drives a lead screw 24. The lead screw 24 is threadably secured to the linear actuator assembly 12 such that rotation of the lead screw 24 results in vertical movement (relative to the orientation of FIG. 1) of the linear actuator assembly 12. As is known in the art, the coarse positioning device 16 can assume a wide variety of other forms. Further, the linear actuator assembly 12 can be configured to provide coarse positioning such that the separate coarse positioning device 16 is not a necessary element.

The servo-controller 18 is also well known in the art, and can assume a wide variety of forms. The servo-controller 18 is generally a microprocessor-based computer including associated memory and associated input/output circuitry. Alternatively, the servo-controller 18 can be a programmable logic controller (PLC) or other controller or equivalent circuitry. Regardless, the servo-controller 18 is configured to interpret information generated by a servo-head (not shown) associated with the magnetic head element 14 that otherwise "follows" a servo-track (not shown) formed along the storage tape 20. Further, the servo-controller 18 controls movement of the linear actuator assembly 12, such as by signaling a current supply (not shown), as well as the coarse positioning device 16.

Figure 2A:
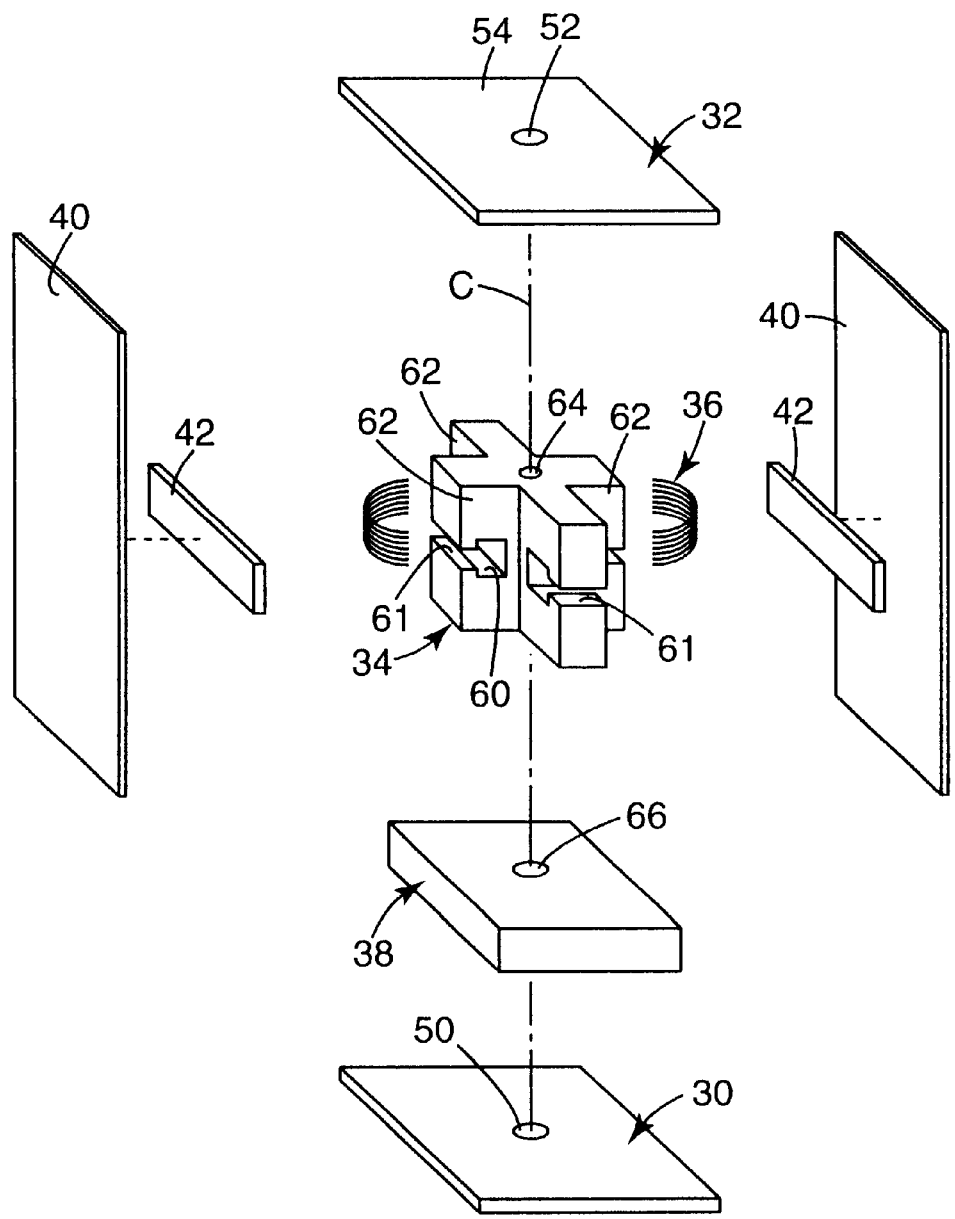
FIG. 2A is an exploded, isometric view of the actuator assembly of FIG. 1.
Figure 2B:
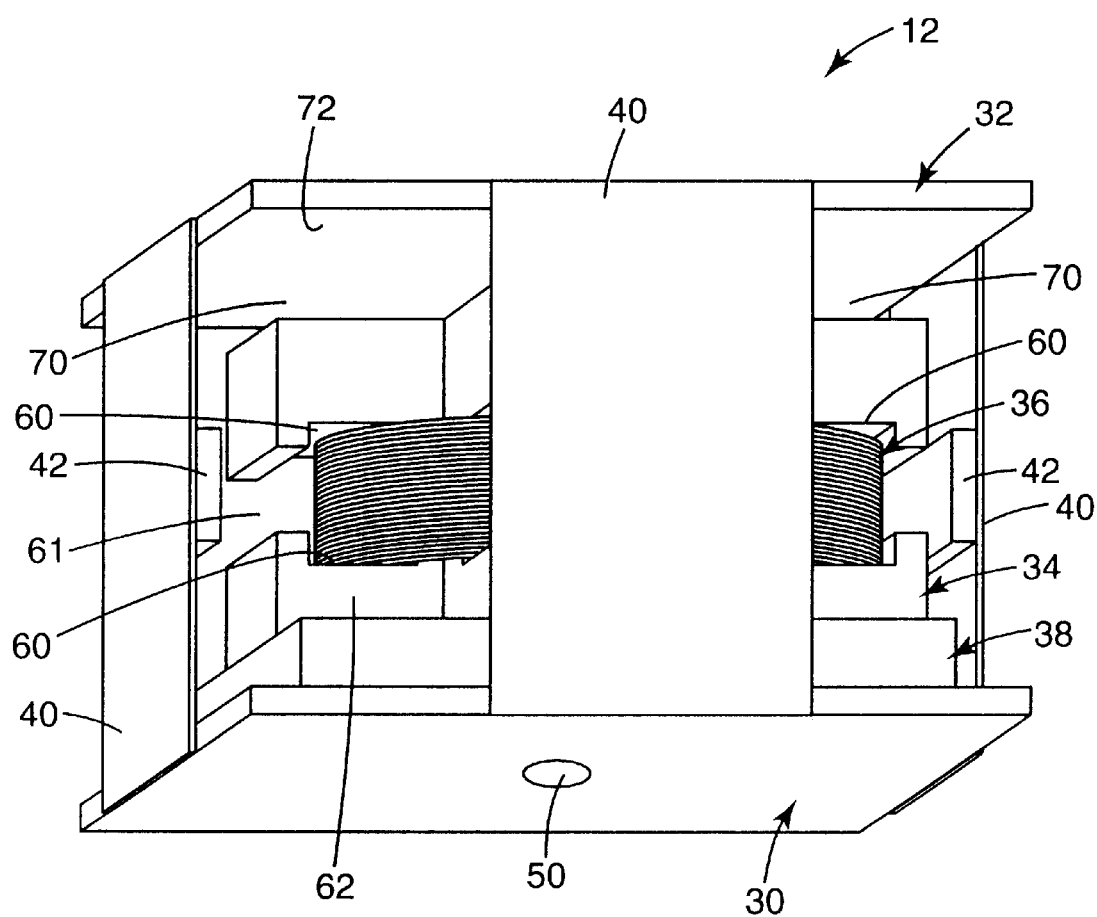
FIG. 2B is an enlarged, isometric view of the assembled actuator assembly of FIG. 1.

The linear actuator assembly 12 is shown in greater detail in FIGS. 2A and 2B. In one preferred embodiment, the linear actuator assembly 12 includes a base 30, a platform 32, a core 34, a coil 36 (shown fragmentally in FIG. 2A), a spacer 38, a plurality of slats 40 and a plurality of magnetic bars 42. These components are described in more detail below. In general terms, however, the coil 36 is wound about the core 34. The core 34 is secured to the spacer 38 that, in turn, is attached to the base 30. The plurality of slats 40 rigidly connect and maintain the platform 32 relative to the base 30. Finally, the plurality of magnetic bars 42 are secured to respective ones of the plurality of slats 40 adjacent the coil 36.

The base 30 and the platform 32 are preferably identical in terms of material and dimensions. In this regard, the base 30 and the platform 32 are formed of a stiff or rigid, non-magnetic material, preferably aluminum. Further, the base 30 forms a first hole 50, whereas the platform 32 forms a second hole 52. As described below, the holes 50, 52 are centrally positioned and facilitate assembly of the linear actuator assembly 12 to the coarse positioning device 16 (FIG. 1), such as by including threads. In one preferred embodiment, the base 30 and the platform 32 are square-shaped. This configuration facilitates implementation of four of the slats 40 (two of which are depicted in FIG. 2A); one of the slats 40 being secured to a respective one of the four sides of the base 30 and the platform 32. With this preferred embodiment, then, the slats 40 rigidly maintain the platform 32 relative to the base 30 in all axes other than the desired linear axis. Alternatively, however, other shapes for the base 30 and the platform 32 are equally acceptable including, for example, triangular, rectangular, circular, etc. Additionally, the base 30 and the platform 32 may not be identically sized. For example, the base 30 may be larger or smaller than the platform 32. Further, the base 30 may be a structural component or encasement of the tape drive 10 (FIG. 1). Finally, an outer surface 54 of the platform 32 is preferably highly flat and is configured to receive and maintain the magnetic head element 14 (FIG. 1).

The core 34 is preferably made from a magnetically permeable material such as iron, ferrite, etc., and forms a slot 60 sized to receive the coil 36, as well as a peripheral gap 61 extending from the slot 60. The gap 61 provides an open area through which a magnetic field generated by the coil 36 can act upon other components, in particular the magnetic bars 42, as described below. In terms of shape, the core 34 corresponds generally with the shape of the base 30 and the platform 32. Thus, in one preferred embodiment, the core 34 is generally square-shaped in transverse cross-section, and preferably includes longitudinal cut-outs 62 by which portions of the coil 36 are more exposed. For reasons described below, however, the core 34 preferably has an outer transverse dimension slightly less than that of the base 30 and the platform 32. With this configuration and upon final assembly, a spacing is established between the plurality of slats 40 and the core 34. Finally, the core 34 preferably forms a third hole 64 extending longitudinally through a central axis C of the core 34. Upon final assembly, the third hole 64 of the core 34 aligns with the holes 50, 52 of the base 30 and the platform 32, respectively.

The coil 36 is of a type known in the art and is configured for winding about the central axis C of the core 34, preferably being maintained within the slot 60. Further, the coil 3 is configured to be electrically connected to a current source (not shown) such as by a coil strap (not shown).

The spacer 38 is preferably formed of a non-magnetic material such as aluminum, and is configured to secure the core 34 to the base 30. As described in greater detail below, the core 34 is preferably centrally disposed between the base 30 and the platform 32 such that a spacing exists between the platform 32 and the core 34. To this end, the spacer 38 as a height equivalent to a desired spacing between the platform 32 and the core 34. Regardless, the spacer 38 is shaped in accordance with a shape of the base 30 and the platform 32 (i.e., preferably square-shaped), having outer dimensions less than those of the base 30 and the platform 32. With this configuration, the spacer 38 does not interfere with desired deflection of the plurality of slats 40 as described below. Finally, in one preferred embodiment, the spacer forms a central hole 66 that, upon final assembly, aligns with the holes 50, 52, and 64 of the base 30, platform 32 and core 34, respectively.

The plurality of slats 40 are preferably formed of a rigid, non-magnetic material such as stainless steel. The slats 40 are preferably identical, and are highly thin especially as compared to a length and width thereof For example, a length:thickness ratio for each of the slats 40 is preferably on the order of, preferably greater than, 500:1. With this configuration, each of the slats 40 are highly rigid, yet deflectable or bendable. Further, the rigid yet thin characteristic of the slats 40 inherently biases the slats 40 toward a straightened state as otherwise depicted in FIGS. 2A and 2B. In other words, following deflection, each of the slats 40 are biased to return to the straightened state.

In a preferred embodiment, the number of slats 40 provided corresponds with the number of sides formed by the base 30 and the platform 32. Thus, in the preferred embodiment where the base 30 and the platform 32 are square-shaped, four of the slats 40 are provided (only two of which are depicted in FIG. 2A), with one of the slats 40 connecting one of the respective sides of the base 30 and the platform 32. Alternatively, however, any number of the slats 40 is acceptable, so long as at least two of the slats 40 are provided. Further, the slats 40 need not be dimensionally identical.

The plurality of magnetic bars 42 are each configured for attachment to respective ones of the slats 40. In a preferred embodiment, each of the magnetic bars 42 has a transverse length approximately a width of the respective slat 40. Each of the magnetic bars 42 are preferably identical in shape and construction, being formed from either a magnetic permeable material such as iron, ferrite, etc., or a permanent magnet material such as cobalt steel.

Assembly of the linear actuator assembly 12 includes assembly of the spacer 38 to the base 30 such that the hole 66 in the spacer 38 is aligned with the hole 50 in the base 30. Any of a number of available mounting techniques are available for secring the spacer 38 to the base 30, such as welding, adhesive, mechanical fasteners, etc. The core 34, including the wound coil 36, is then secured to the spacer 38 such that the hole 64 in the core 34 is aligned with the hole 66 in the spacer 38. Once again, any available mounting technique can be employed.

The magnetic bars 42 are secured to respective ones of the slats 40 as otherwise shown in FIG. 2k Again, any of a number of available mounting techniques can be utilized, including welds, adhesives, mechanical fasteners, etc. Regardless, the magnetic bars 42 are preferably centrally disposed relative to a length of the respective slats 40.

The plurality of slats 40 are then assembled to the base 30 and the platform 32 so as to rigidly maintain the platform 32 relative to the base 30. In this regard, the slats 40 are preferably equidistantly spaced about a perimeter of the base 30 and the base 32, aligning the hole 52 in the platform 32 with the hole 64 in the core 34. Further, a length of each of the slats 40 is such that a spacing 70 is defined between the core 34 and an inner surface 72 of the platform 32. In this regard, so that the core 34, and thus the coil 36, is centrally disposed between the base 30 and the platform 32, a length of the slats 40 is such that the spacing 70 has a height approximating a height of the spacer 38. The spacing 70 is equivalent to a maximum linear movement of the linear actuator assembly 12 (i.e., from a initial state in which the slats 40 are "straight" to a maximum deflection state in which the slats 40 deflect to a point at which the platform 32 contacts the core 34). Because the linear actuator assembly 12 is preferably employed to perform fine positioning of a tape drive head element 14 (FIG. 1), the spacing 70 is preferably at least as "high" as a width of an individual data track.

Upon final assembly, and as best shown in FIG. 2B, the plurality of slats 40 rigidly maintain the platform 32 opposite the base 30. Further, the plurality of magnetic bars 42 are positioned adjacent the coil 36 and the peripheral gap 61 formed in the core 34. In this regard, a spacing is established between each of the magnetic bars 42 and a corresponding outer portion of the core 34. The plurality of slats 40 render the linear actuator assembly 12 highly rigid in all directions other than the linear axis (or central axis C). In other words, the plurality of slats 40 resist a torsion or twisting motion of the platform 32 relative to the base 30, as well as tilting of the platform 32 relative to the base 30. Further, by preferably providing at least one of the slats 40 along each of the respective sides of the base 30 and the platform 32, uniform, linear movement of the platform 32 relative to the base 30 is virtually ensured.

As previously described, and in one preferred embodiment, once assembled, the linear actuator assembly 12 is preferably coupled to the coarse positioning device 16 (FIG. 1). For example, in one preferred embodiment, the various holes 50, 52, 64, 66 are aligned to define a passage configured to threadably receive the lead screw 24 (FIG. 1) of the coarse positioning device 16. Alternatively, a differently configured coarse positioning device need not include the lead screw 24 such that the linear actuator assembly 12 does not require formation of the various holes 50, 52, 64, and 66 for assembly thereto.

Finally, the magnetic head element 14 (FIG. 1) is assembled to the outer surface 54 of the platform 32. In this regard, a wide variety of coupling techniques can be employed, such as welds, adhesives, mechanical fasteners, etc. The entire assembly is mounted within or as part of the tape drive 10 (FIG. 1).

Figure 3A:
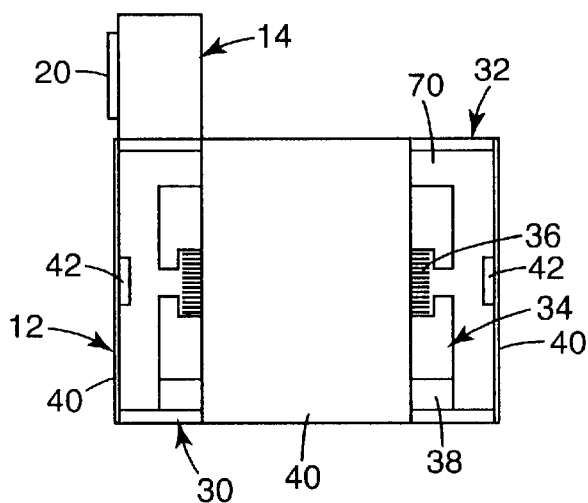
FIGS. 3A–3C illustrate operation of the linear actuator assembly as part of a tape drive in accordance with the present invention.
Figure 3B:
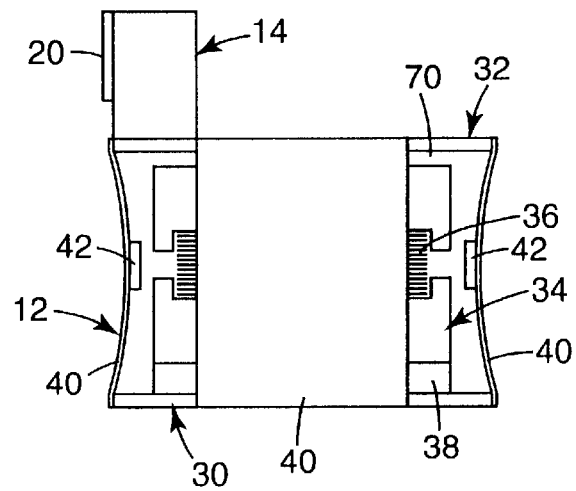
Figure 3C:
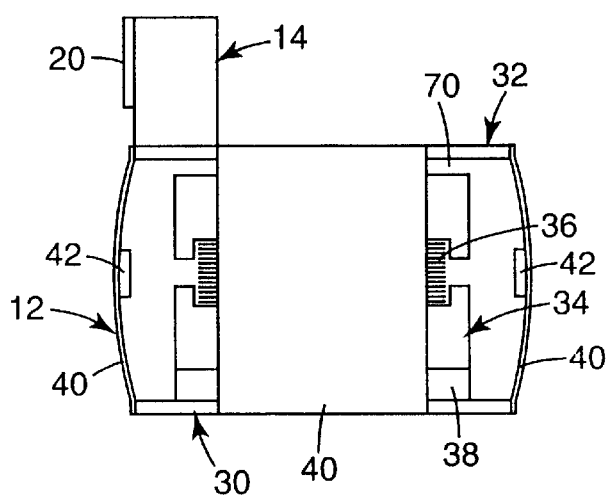

Use of the linear actuator assembly 12 is best described with reference to FIGS. 3A–3C. As a point of reference, FIGS. 3A–3C are simplified, side views of the linear actuator assembly 12 maintaining the magnetic head element 14 relative to the storage tape 20. For ease of illustration, FIGS. 3A–3C do not include the coarse positioning device 16 (FIG. 1) or the servo-controller 18 (FIG. 1). It will be understood, however, that the coarse positioning device 16 is employed to index the magnetic head 14, via the coupling to the linear actuator assembly. 12, relative to the storage tape 20. Further, the servo-controller 18 is utilized to effectuate closed-looped servo-controlled positioning of the magnetic head element 14 relative to the storage tape 20 via the linear actuator assembly 12 and the coarse positioning device 16.

With specific reference to FIG. 3A, following indexing, the coil 36 initially is not energized such that the plurality of slats 40 are in the "straightened" state. As previously described, the plurality of slats 40 rigidly maintain the platform 32 relative to the base 30 such that planes defined by the base 30 and the platform 32 are parallel, the central axis C of the core 34 is perpendicular to the plane of the platform 32, and the spacing 70 is defined between the platform 32 and the core 34. As such, the magnetic head element 14 is linearly positioned for proper interface with the magnetic storage tape 20.

As the storage tape 20 is transported across the magnetic head element 14, the servo-controller 18 (FIG. 1) monitors precise or fine positioning of the magnetic head element 14 relative to the storage tape 20. For example, in one preferred embodiment, the storage tape 20 includes a servo-track that is "followed" by a designated read head associated with the magnetic head element 14. As is known in the art, this designated read head provides a signal to the servo-controller 18 (FIG. 1) indicative of transverse alignment of the magnetic head element 14 relative to the storage tape 20 and its transport path. Thus, the designated read head will "sense" a transverse displacement of the storage tape 20 relative to the magnetic head element 14, caused, for example, by tape edge wear, thermal expansion, etc. In response to this position error signal, the servo-controller 18 determines the level of transverse deviation and prompts the linear actuator assembly 12 to compensate for this deviation or positioning error. For example, in one preferred embodiment, the servo-controller 18 is electrically connected to a current supply (not shown) otherwise electrically connected to the coil 36. Further, the servo-controller 18 will be programmed with data correlating current flow values to the coil 36 with resulting deflection of the slats 40 and corresponding linear movement of the platform 32 relative to the base 30. Once the servo-controller 18 ascertains requisite linear movement (or correction) and the corresponding current supply value, the servo-controller 18 prompts supply of the so-determined current to the coil 36.

As shown in FIG. 3B, energization of the coil 36 instantaneously generates or produces a magnetic field, for example in the slot 60 and the peripheral gap 61 otherwise formed by the core 34. In the embodiment of FIG. 3B, the magnetic bars 42 are formed of a magnetically permeable material. As a result, the magnetic field produces an attractive force on the magnetic bars 42 positioned adjacent the peripheral gap 61. This attractive force, in turn, causes the plurality of slats 42 to instantaneously deflect inwardly relative to the base 30 and the platform 32. To this end, and in accordance with the one preferred embodiment, by centrally positioning the magnetic bars 42 relative to the slats 40, respectively, the slats 40 will deflect or bend in a uniform fashion. Deflection of the slats 40 causes the platform 32 to move linearly toward the base 30 in a substantially uniform fashion. In other words, the plane of the platform 32 remains parallel with the plane of the base 30, but the platform 32 moves closer to the base 30, resulting in a corresponding linear movement of the magnetic head element 14 transverse to the storage tape 20. As a point of reference, the linear movement of the platform 32 relative to the base 32 is typically extremely small, on the order of 0.0001 inch, and has been exaggerated in FIGS. 3B and 3C for purposes of illustration. The coil 36 can remain energized at the same level (via a continuous current supply) for an extended period so that the magnetic head element 14 remains precisely aligned with the storage tape 20. The servo-controller 18 continues to monitor positioning of the head element 14 relative to the storage tape 20, adjusting current supply to the coil 36 accordingly.

In an alternative embodiment and with reference to FIG. 3C, the plurality of magnetic bars 42 are each formed of a permanent magnet material. As a result, the magnetic field generated by energization of the coil 36 produces a repulsive force on the magnetic bars 42, resulting in the slat 40 deflection, and linear movement of the magnetic head element 14, shown in FIG. 3C.

While the linear actuator assembly 12 has been described as having the slats 40 in an initially "straightened" state, other variations can be employed whereby the plurality of slats 40 are initially partially deflected. In other words, the plurality of slats 40 can be "pre-loaded" or biased to a partially deflected state, such that vertical, linear motion of the platform 32 in either direction is available to compensate for transverse tape position deviations. For example, the plurality of bars 42 can be comprised of a permanent magnet material, and a separate permanent magnet can be formed in the gap 61 (FIG. 2B) that "pre-loads" or attracts the bars 42, and thus pre-deflects the plurality of slats 40. Alternatively, a continuous current can initially be supplied to the coil 36, again resulting in an initial deflection of the plurality of slats 40.

Regardless of whether the slats 40 are pre-loaded, the linear actuator assembly 12 of the present invention provides a substantial mechanical advantage (via deflection of the slats 40 in response to a small current supplied to the coil 36), which results in the potential to develop a large force. More importantly, the inertia of the magnetic head element 14 is translated to the plurality of slats 40 by the factor of a reciprocal of the mechanical advantage squared.

The linear actuator assembly of the present invention provides a marked improvement over previous designs. Construction of the linear actuator assembly is relative simplistic, and therefore relative inexpensive especially on a mass production basis. Further, the linear actuator assembly rigidly maintains the magnetic head assembly along all axes, except for the desired linear (or central) axis. Thus, the linear actator assembly is capable of generating large forces over small distances and potentially large bandwidths without frictional components, and can easily to accommodate a coarse positioning device. Finally, the linear actuator assembly is highly amenable to fine positioning of a magnetic head element as part of a closed-loop, servo-controlled system.

Although the present invention has been described with reference to preferred embodiment, workers skilled in the art will recognize that changes can be made in form and detail without departing from the spirit and scope of the present invention. For example, the linear actuator assembly has been described with reference to use in a tape drive. Alternatively, however, the linear actuator assembly can be used with other applications such as fine positioning of a magnetic head element associated with a disk drive. Even further, the linear actuator assembly can be used within any device requiring fine, linear movement of an internal component thereof

What is claimed is:

1. A magnetic head element linear actuator assembly comprising:
   a base;
   a platform positioned opposite the base and configured to maintain a magnetic head element;
   a core disposed between the base and the platform such that a space is defined between the core and the platform;
   a coil wound about a central axis of the core;
   a plurality of slats maintaining the platform relative to the base, the plurality of slats being deflectable from a straightened state and biased to return to the straightened state following deflection; and
   a plurality of magnetic bars secured to respective ones of the plurality of slats;
   wherein a magnetic field generated by the coil induces deflection of the plurality of slats via the magnetic bars, causing the platform to move linearly toward the base.

2. The linear actuator assembly of claim 1, further comprising:
   a spacer connecting the core to the base.

3. The linear actuator assembly of claim 2, wherein a height of the spacer is equal to a height of the space between the platform and the core.

4. The linear actuator assembly of claim 1, wherein the core is centrally positioned between the platform and the base.

5. The linear actuator assembly of claim 1, wherein the core forms a slot for receiving the coil.

6. The linear actuator assembly of claim 1, wherein the central axis of the core is perpendicular to a plane of the platform.

7. The linear actuator assembly of claim 1, wherein each of the plurality of slats have a length:thickness ratio greater than 500:1.

8. The linear actuator assembly of claim 1, wherein the plurality of slats includes four slats.

9. The linear actuator assembly of claim 1, wherein the plurality of slats are secured to a periphery of the platform.

10. The linear actuator assembly of claim 1, wherein the plurality of slats are equidistantly spaced relative to a periphery of the platform.

11. The linear actuator assembly of claim 1, wherein each of the plurality of slats extend, in the straightened state, in a plane parallel with the central axis of the core.

12. The linear actuator assembly of claim 1, wherein the platform is square-shaped, and the plurality of slats include four slats secured to respective sides of the platform.

13. The linear actuator assembly of claim 1, wherein the magnetic bars are comprised of a magnetically permeable material such that the magnetic field generated by the coil attracts the magnetic bars, causing inward deflection of the plurality of slats.

14. The linear actuator assembly of claim 1, wherein the magnetic bars are comprised of a permanent magnet material such that the magnetic field generated by the coil repels the magnetic bars, causing outward deflection of the plurality of slats.

15. The linear actuator assembly of claim 1, further comprising:
   a first access hole in the platform;
   a second access hole in the core; and
   a third access hole in the base;
   wherein the access holes are aligned and are sized to receive a portion of a coarse positioning device.

16. A tape drive for recording data on, and reading data from, any one of a plurality of parallel data tracks extending along a length of magnetic storage tape by a magnetic head element adapted to interface with the tape along a tape transport path and to be variably positioned transversely relative to the tape transport path, the tape drive comprising:
   a magnetic head element; and
   a fine positioning, linear actuator assembly for maintaining the magnetic head element at an interface position with respect to the storage tape and maneuvering the magnetic head element transversely relative to the tape transport path, the linear actuator assembly comprising:
      a base,
      a platform positioned opposite the base, the magnetic head element being secured to an outer surface of the platform,
      a core disposed between the base and the platform such that a spacing exists between the core and an inner surface of the platform,
      a coil wound about a central axis of the core,
      a plurality of slats rigidly maintaining the platform relative to the base, the plurality of slats being deflectable from a straightened state and biased to return to the straightened state following deflection,
      a plurality of magnetic bars secured to respective ones of the plurality of slats adjacent the coil;
      wherein a magnetic field selectively generated by the coil induces deflection of the plurality of slats via the magnetic bars, causing the platform and the attached head element to move toward the base, transversely relative to the tape transport path.

17. The tape drive of claim 16, wherein the actuator assembly forms a central access passage, the tape drive further comprising:
   a coarse positioning device secured to the linear actuator assembly via the central access passage.

18. The tape drive of claim 16, wherein deflection of the plurality of slats from the straightened state bears is a known relationship to a current supplied to the coil, the tape drive further comprising:
   a servo-controller electrically connected to the magnetic head element and the coil, the servo-controller configured to interpret tracking information from the head element, determine a transverse correction value, determine a correlated coil current supply value, and prompt current delivery to the coil commensurate with the correlated coil current supply value.

19. The tape drive of claim 16, wherein the spacing between the cores and the platform is at least as large as a width of an individual data track on the storage tape.

20. The tape drive of claim 16, wherein the plurality of slats includes four slats.

* * * * *